United States Patent
Lux et al.

(10) Patent No.: US 10,663,160 B2
(45) Date of Patent: May 26, 2020

(54) BEVERAGE DISPENSER AND REFRIGERATION APPLIANCE WITH BEVERAGE DISPENSER

(71) Applicant: BSH HAUSGERAETE GMBH, Munich (DE)

(72) Inventors: Denis Lux, Heidenheim (DE); Tobias Mayr, Bachhagel (DE); Elena Claass, Geislingen (DE); Andrea Fink, Gerstetten (DE); Jessica Dittmann, I, Herbrechtingen (DE); Armin Weber, Lauchheim (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 16/170,288

(22) Filed: Oct. 25, 2018

(65) Prior Publication Data

US 2019/0120478 A1    Apr. 25, 2019

(30) Foreign Application Priority Data

Oct. 25, 2017 (DE) .......................... 10 2017 219 044

(51) Int. Cl.
| | |
|---|---|
| *F21V 33/00* | (2006.01) |
| *B67D 1/00* | (2006.01) |
| *F25D 23/12* | (2006.01) |
| *F25D 27/00* | (2006.01) |
| *F21V 8/00* | (2006.01) |
| *F21Y 115/10* | (2016.01) |
| *F21Y 103/10* | (2016.01) |

(Continued)

(52) U.S. Cl.
CPC ............ *F21V 33/0044* (2013.01); *B67D 1/00* (2013.01); *F25D 23/126* (2013.01); *F25D 27/00* (2013.01); *G02B 6/0073* (2013.01); *F21W 2131/305* (2013.01); *F21Y 2103/10* (2016.08); *F21Y 2115/10* (2016.08); *F25D 23/04* (2013.01); *F25D 2327/001* (2013.01); *F25D 2331/804* (2013.01); *F25D 2331/806* (2013.01)

(58) Field of Classification Search
CPC .......... F21V 33/0044; F21D 2327/001; B67D 1/0875; B67D 1/0874; F25D 27/00; F25D 27/005

See application file for complete search history.

(56) References Cited

U.S. PATENT DOCUMENTS

| | | | | |
|---|---|---|---|---|
| 4,323,951 A | * | 4/1982 | Pasco ..................... | G12B 11/02 362/23.01 |
| 5,432,684 A | * | 7/1995 | Fye ........................ | G01D 11/28 200/314 |
| 9,488,406 B2 | | 11/2016 | Grzyb et al. | |

(Continued)

FOREIGN PATENT DOCUMENTS

EP    3045848 A1    7/2016

*Primary Examiner* — Matthew J. Peerce
(74) *Attorney, Agent, or Firm* — Laurence A. Greenberg; Werner H. Stemer; Ralph E. Locher

(57) ABSTRACT

A beverage dispenser has a housing enclosing a dispenser recess, at least one light inlet window for lighting the dispenser recess, a printed circuit board, on which a number of LEDs are arranged to feed light into the dispenser recess by way of the at least one light inlet window. The printed circuit board is mounted on the housing of the dispenser recess above an LED housing, which seals the light inlet window.

15 Claims, 6 Drawing Sheets

(51) Int. Cl.
*F21W 131/305* (2006.01)
*F25D 23/04* (2006.01)

(56) References Cited

U.S. PATENT DOCUMENTS

| | | | | |
|---|---|---|---|---|
| 2005/0044871 | A1* | 3/2005 | Nowak | B67D 1/0875 62/264 |
| 2006/0201190 | A1* | 9/2006 | Bowen | F25D 23/126 62/344 |
| 2008/0163641 | A1* | 7/2008 | Mitchell | B67D 1/0875 62/389 |
| 2011/0072842 | A1* | 3/2011 | Park | F25D 27/00 62/264 |
| 2011/0139817 | A1* | 6/2011 | Lu | F25D 27/00 62/264 |
| 2011/0174008 | A1* | 7/2011 | Kim | F25D 23/126 62/264 |
| 2012/0103000 | A1* | 5/2012 | Krause | F25D 23/126 62/389 |
| 2012/0103001 | A1* | 5/2012 | Krause | G02B 6/0008 62/389 |
| 2016/0209105 | A1* | 7/2016 | Grzyb | F25D 23/04 |

\* cited by examiner

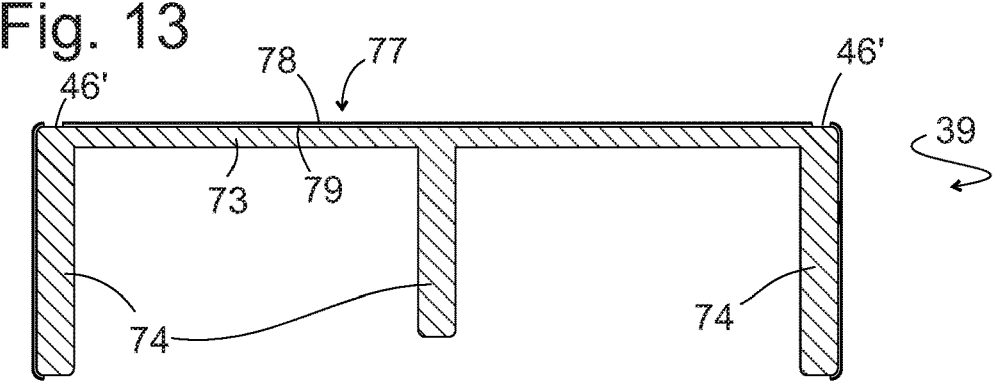
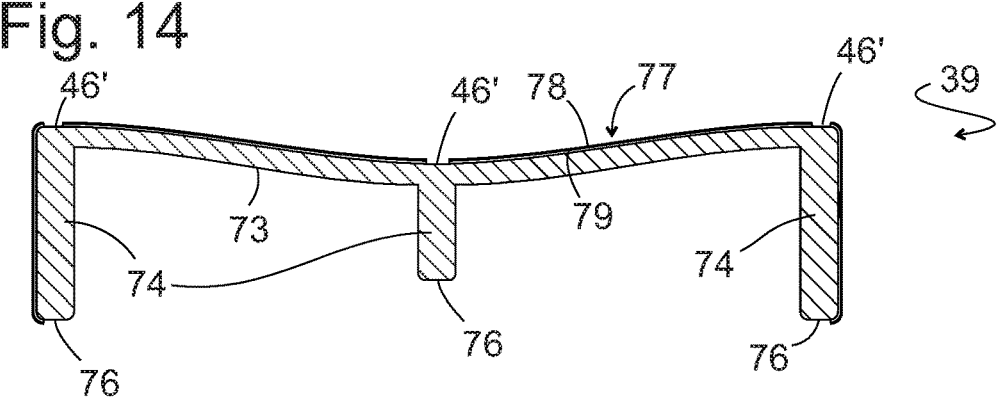
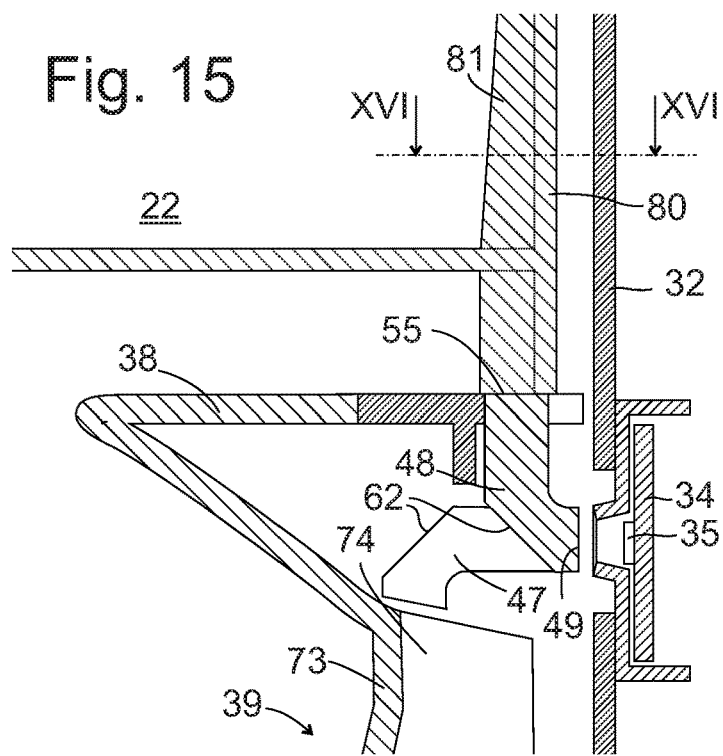
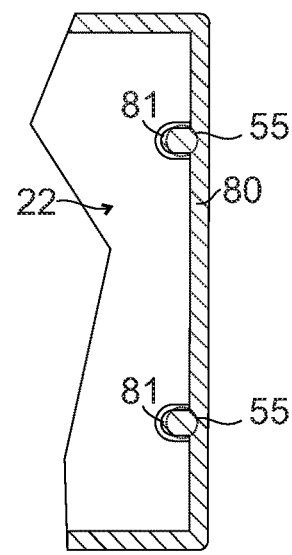

BEVERAGE DISPENSER AND REFRIGERATION APPLIANCE WITH BEVERAGE DISPENSER

CROSS-REFERENCE TO RELATED APPLICATION

This application claims the priority, under 35 U.S.C. § 119, of German application DE 10 2017 219 044.2, filed Oct. 25, 2017; the prior application is herewith incorporated by reference in its entirety.

BACKGROUND OF THE INVENTION

Field of the Invention

The present invention relates to a beverage dispenser and a refrigeration appliance, in particular a domestic refrigeration appliance, in which such a beverage dispenser is fitted.

A significant part of most beverage dispensers is a housing that delimits a dispenser recess, a component in the form of a box open at a front face, mounted in a countersunk manner in a heat-insulating outer wall of the refrigeration appliance, so that its open front face forms a depression in the outer wall, into which a vessel can be introduced, in order that it can be filled by way of an outlet arranged at the top of the dispenser recess.

Because, when the beverage dispenser is used, the dispenser recess is shaded by the user standing in front of it, the dispenser recess generally has a light. Thus a beverage dispenser is known from published, European patent application EP 3 045 848 A1, corresponding to U.S. Pat. No. 9,488,406, for example, in which a printed circuit board with LEDs is arranged at the top of the housing, above the dispenser recess, and the dispenser recess is lit by way of light guides let into the top, which receive the light from the LEDs.

The light guides make assembly of the dispenser complex, as they either have to be attached individually to the top of the housing or the top of the housing and the light guides have to be molded to one another; they also mean that a high level of accuracy is required when manufacturing the individual parts of the dispenser, as inaccuracies when positioning the LEDs on the printed circuit board, when positioning the light guides on the housing and when positioning the printed circuit board on the housing can mean that the LEDs are aligned incorrectly relative to the light guides or the printed circuit board with the LEDs and the housing of the dispenser recess do not correspond.

SUMMARY OF THE INVENTION

It is therefore the object of the invention to create a beverage dispenser, which allows the dispenser recess to be lit in such a manner as to facilitate use and can be mounted efficiently and at low cost in the process.

The object is achieved in that in the case of a beverage dispenser with a housing enclosing a dispenser recess and having at least one light inlet window for lighting the dispenser recess, a printed circuit board, on which a number of LEDs are arranged to feed light into the dispenser recess by way of the at least one light inlet window, and a number of light guides for distributing light from the LEDs in the dispenser recess. The printed circuit board is mounted on the housing of the dispenser recess above an LED housing, which seals the light inlet window. Manufacturing tolerances of the housing of the dispenser recess here no longer have any influence on the feeding of the light into the dispenser recess; only the LED housing has to be attached in the light inlet window rather than a number of light guides.

The surface on which the LED housing and the housing of the dispensers touch in a sealing manner is preferably flat; this allows the position of the LED housing on the housing to be corrected within certain limits, if necessary, without having an adverse effect on the seal of the connection.

In order to facilitate the electrical wiring of the printed circuit board, in particular to allow a printed circuit board already provided with a connecting cable to be fitted easily in the beverage dispenser, the LED housing is preferably inserted into the light inlet window from the side facing away from the dispenser recess.

In order to protect the LED printed circuit board from splashes of liquid in the dispenser recess, the LED housing should be watertight in the direction of the dispenser recess. It must also allow the passage of light, at least locally. This is achieved most easily if the LED housing is molded as a single piece from transparent material.

In order to conduct the light from the LEDs into the dispenser recess with as little loss as possible, the LED housing can contain lenses arranged in the beam path of the LEDs.

The housing of the dispenser and the LED housing can have interacting contours to allow the LED housing to be attached to the housing with a single orientation. Similarly the LED housing and the printed circuit board can have interacting contours to allow the printed circuit board to be attached to the LED housing with a single orientation. This prevents the LED printed circuit board from being mounted on the housing of the dispenser with an orientation which does not allow correct contact with the LEDs when the beverage dispenser has been fitted in a refrigeration appliance.

In order to be able to distribute the light from the LEDs in the dispenser recess in such a manner that orientation is easy for a user, at least one light guide can be arranged adjoining one of the light inlet windows in the dispenser recess.

The light should in particular ensure that an actuation lever is clearly visible in the dispenser recess. To ensure that it is lit correctly despite manufacturing tolerances, the at least one light guide can be held on a socket of the actuation lever.

Instead of lighting up the actuation lever from the outside, the at least one light guide can be arranged in such a manner as to feed light into the actuation lever. So that the light in the actuation lever can be diffused to a light outlet, said light outlet should be made of transparent material.

In order to be able to restrict the egress of light to a light outlet in an actuation lever made largely or completely of transparent material, the actuation lever should be provided with an opaque coating and the light outlet should be formed by a gap in the opaque coating.

The opaque coating can contain an inner and outer layer, the inner layer being lighter than the outer one, in order to conduct the light in the actuation lever to the light outlet with as little loss as possible.

In order to increase the egress of light at the light outlet of the actuation lever, the light outlet and a rough surface scattering the light diffused in the actuation lever can be opposite one another on two sides of the actuation lever. The rough surface can in particular be grooved, preferably at right angles to the direction in which the light is diffused in the actuation lever, to form facets, which reflect the light in the direction of the light outlet.

In order to guide light fed in by way of the light guide to the light outlet with little loss, the lever arm can have a fin, which projects from a base plate of the lever arm and extends from the end of the light guide to the light outlet. Because the fin guides most of the light emitted by the light guide, it prevents it from being distributed in the widthwise direction of the base plate and thereby missing the light outlet. The rough surface mentioned above can be an edge of the fin facing away from the base plate.

The at least one light guide can also be arranged in such a manner as to light a beverage container arranged above the dispenser recess. This allows diffuse illumination of the dispenser recess by light reflected off the lower face of the beverage container. If this lower face is transparent, the reflected light can be tinged by the beverage present in the beverage container, so the color in which the dispenser recess is illuminated indicates the beverage. In particular in the case of a dispenser recess, in which a number of beverage containers and actuation levers for drawing from the beverage containers are arranged close to one another, this measure helps to prevent the drawing of a different beverage from the one desired.

The dispenser recess is necessarily open toward a front face of the housing, in order to allow the introduction of a vessel to be filled into the dispenser recess. A holder for a beverage container can be provided in the housing above the dispenser recess.

The housing is preferably let into a heat-insulating wall of the refrigeration appliance. If the dispenser recess is open toward an outer face of the wall, the holder here can preferably be accessible from an inner face of the wall, to allow cooling of the beverage container by way of a storage compartment of the refrigeration appliance adjoining the inner face.

Other features which are considered as characteristic for the invention are set forth in the appended claims.

Although the invention is illustrated and described herein as embodied in a beverage dispenser and a refrigeration appliance with a beverage dispenser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 13 is a sectional view through an arm of the actuation lever;

FIG. 14 is a further sectional view through the arm;

FIG. 15 is a second vertical sectional view through the beverage dispenser according to the second embodiment; and FIG. 16 is a sectional view through a wall of a beverage container supplying the beverage dispenser.

DETAILED DESCRIPTION OF THE INVENTION

Figure 1:
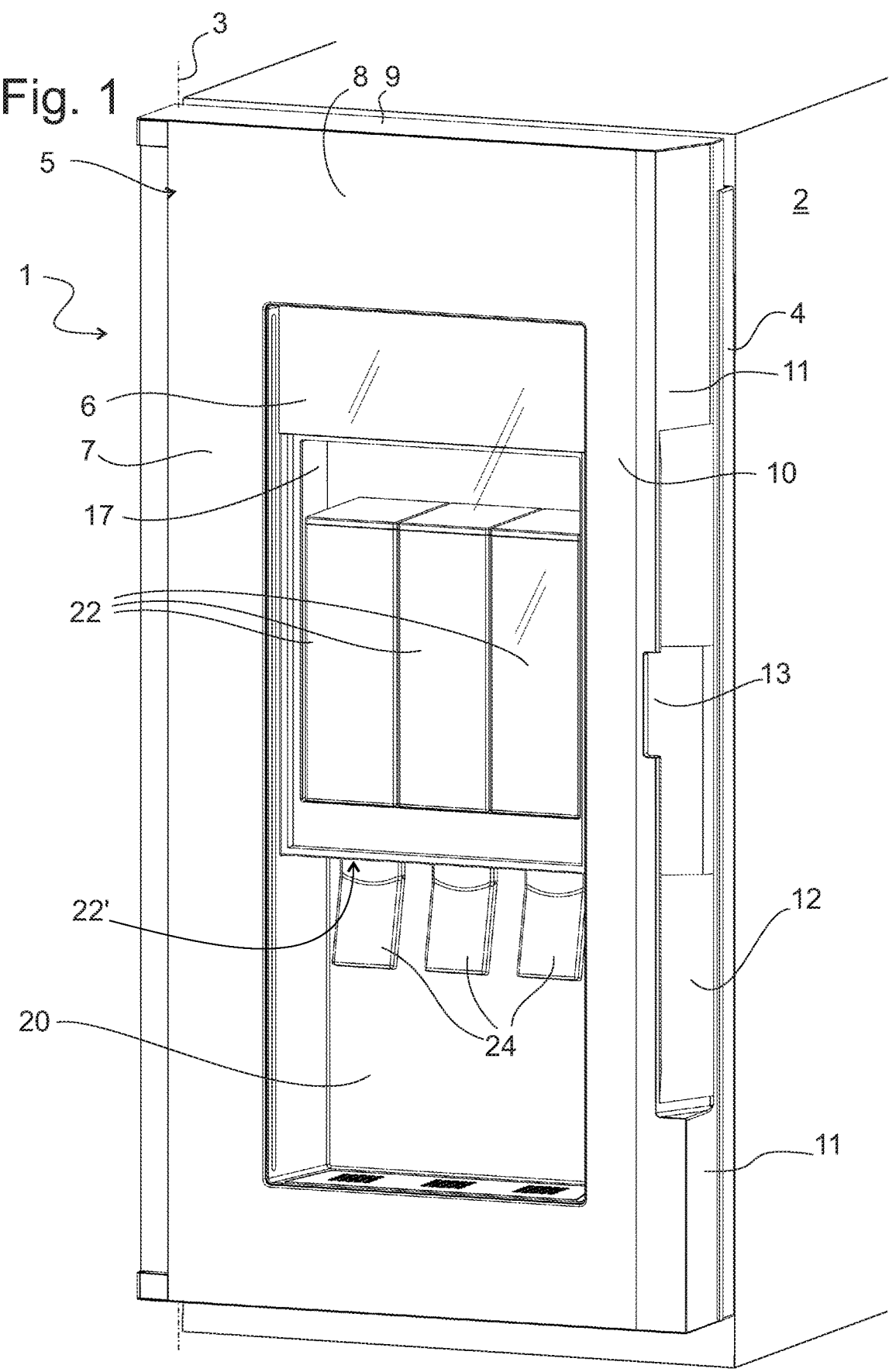
FIG. 1 is a diagrammatic, perspective external view of a door assembly of an inventive refrigeration appliance.

Referring now to the figures of the drawings in detail and first, particularly to FIG. 1 thereof, there is shown a door assembly 1 and an only partially shown body or carcass 2 form a housing of a domestic refrigeration appliance, which encloses a storage compartment for chilled goods. The door assembly 1 is hinged to the body 2 in such a manner that it can pivot about an axis 3.

The door assembly 1 contains a door 4 in the narrower sense, which closes the storage compartment, and a cover 5, which can pivot about the same axis 3 relative to the door 4. In the view in FIG. 1 the majority of the door 4 is concealed by the cover 5.

The cover 5 contains a window pane 6 made of clear or tinted glass or plastic, in this instance bordered by a non-transparent frame 7. An upper bar of the frame 7 is L-shaped in cross section, with one leg 8 extending vertically upward from the window pane 6 and one leg 9 extending beyond an upper flank of the door 4 at an angle from an upper edge of the leg 8 to the carcass 2. A right bar of the frame similarly contains one leg 10 extending from the right edge of the window pane 6 in the widthwise direction of the door assembly 1 and one leg 11 at an angle to the carcass, which is divided into an upper and lower half by a handle cutout 12. A center piece 13 of the handle cutout 12 extends from the edge into the leg 10.

Figure 2:
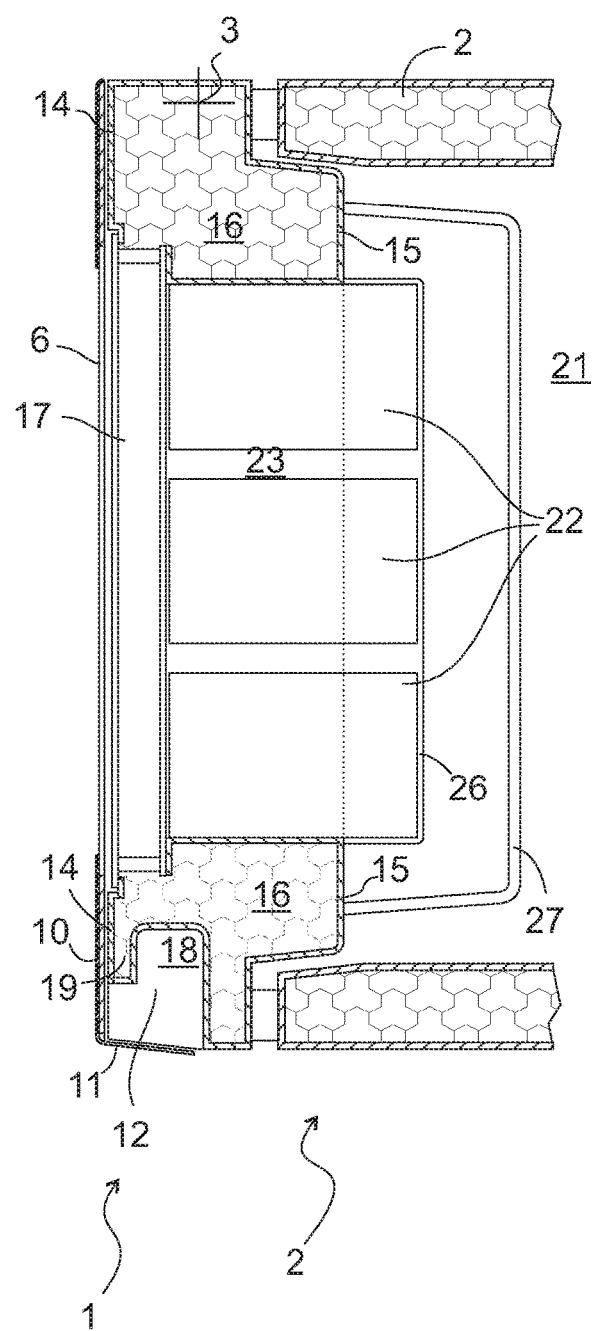
FIG. 2 is a horizontal sectional view through the door assembly at the level of beverage containers mounted therein.

FIG. 2 shows a horizontal section through the door assembly 1 along a plane running at the level of the handle cutout 12 just above the center piece 13. In the standard manner the door 4 contains solid outer and inner walls 14, 15, which are connected along their edges, to form a follow space filled with heat-insulating foam material 16. An opening is cut into both the outer and inner walls 14, 15, an insulating glass pane 17 being inserted therein and connected in a sealed manner to the walls 14, 15. A handle groove 18 that is open at the side is cut out of a side flank of the door 4. The handle groove 18 is delimited by a web 19 on its side facing the cover 5. The leg 10 of the cover projects sideways beyond the web 19, so that a user engaging in the handle cutout 12 at the level of the section plane of FIG. 2 grips the leg 10 of the cover 5 but not necessarily also the web 19 of the door 4, so that by pulling the leg 10, the user pivots the cover 5 about the axis 3 but not the door 4.

Figure 3:
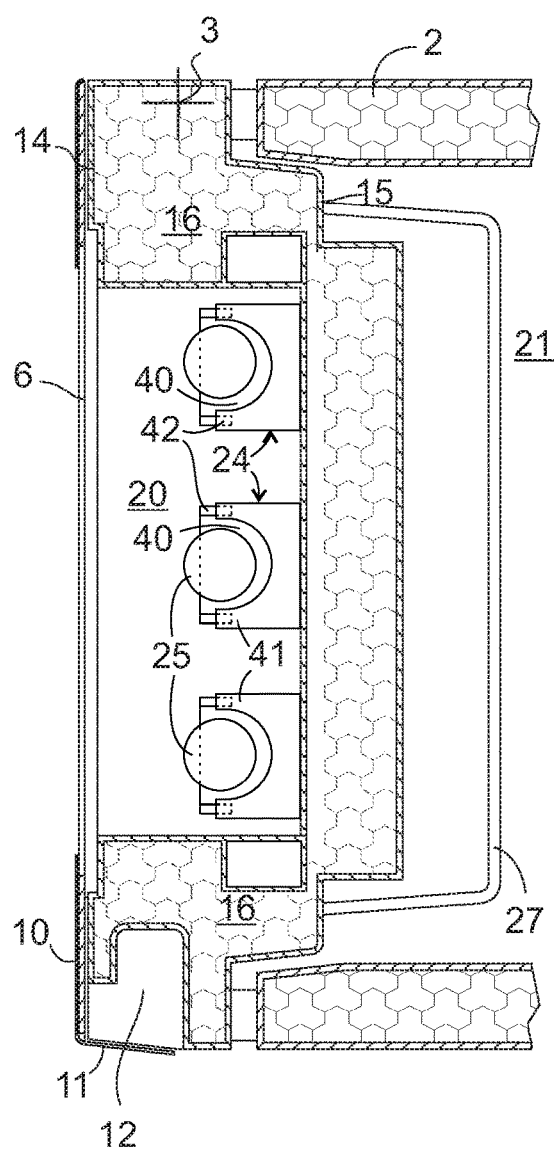
FIG. 3 is a sectional view through the door assembly at the level of a dispenser recess.

Pivoting just the cover 5 about the axis 3 gives access to a dispenser recess 20, which is cut out of a lower part of the door 4 and shown in FIG. 3 in a horizontal section through the door assembly 1.

In contrast at the level of the center piece 13 the edge of the leg 10 is flush with the web 19, so that a user gripping at the level of the center piece engages in the handle groove 18 and therefore pivots the entire door assembly 1 about the axis 3, giving access to a storage compartment 21 for chilled goods in the interior of the carcass 2.

FIG. 2 shows a sectional view of a number of beverage containers 22, housed in a recess 23 delimited by the insulating glass pane 17 and flanks of the inner wall 15 of the door 4 adjoining it and open in the direction of the storage compartment 21. As shown in FIG. 1, the beverage containers 22 are visible through the insulating glass pane 17 and the window pane 6. Lower faces 22' of the beverage containers 22 are exposed at the top of the dispenser recess 20. The beverage containers 22 can have labels indicating their contents, which are visible through the panes 6, 17. The beverage containers 22 are preferably made of a transparent plastic, so the color and fill level of their contents are visible through the panes 6, 17.

An actuation lever 24 is mounted below each beverage container 22 in the dispenser recess 20, serving (in a manner explained in more detail below) to open a valve 25 on the lower face 22' of the beverage container 22 arranged above it, when a vessel is pushed against the actuation lever 24 in the dispenser recess 20, and to fill the vessel with beverage from the container 22.

Figure 4:
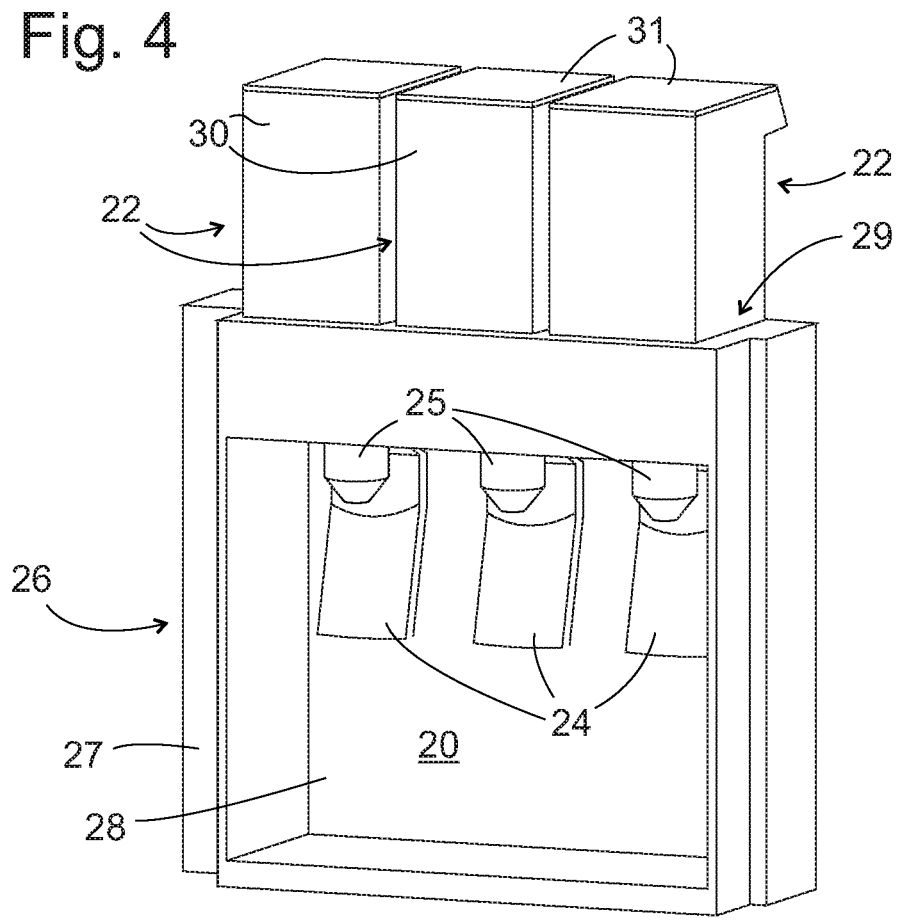
FIG. 4 is a perspective view of the dispenser of the door assembly from FIG. 1.

FIG. 4 shows the dispenser without the door 4 enclosing it in a view corresponding roughly to the one in FIG. 1. The dispenser recess 20 is delimited by a roughly box-shaped housing 26, which is injection molded from plastic and generally made up of a number of molded parts. At its front face 27 the housing has an opening 28, which in the assembled state is exposed at the front face of the door 4 and forms the entrance to the dispenser recess 20. An upper face of the housing 26 is similarly open; it forms a holder 29, into which the beverage containers 22 are inserted from above as far as a stop.

The beverage containers 22 are essentially box-shaped. They each comprise a container lower part 30 made of preferably clear plastic, its open upper face being closed by a lid 31 and the valve 25 being mounted on its lower face.

The valves 25 and the actuation lever 24 are visible through the opening 28 in FIG. 4.

Figure 5:
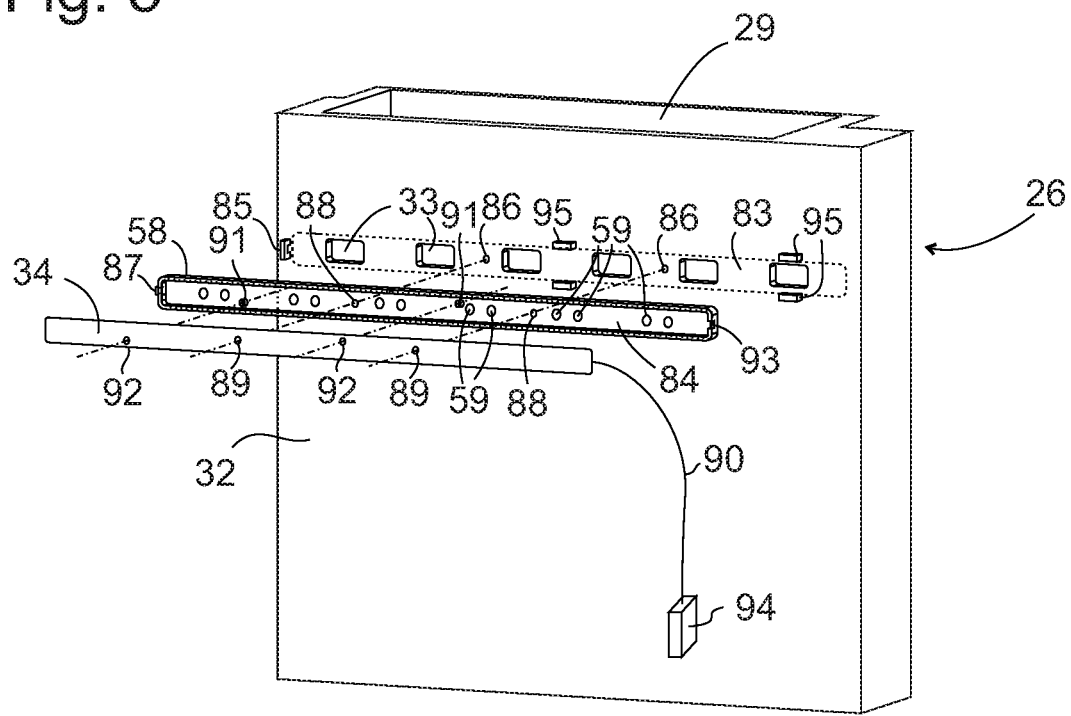
FIG. 5 is a perspective, rear view of a housing of the dispenser.

FIG. 5 shows the housing 26 viewed from the opposite direction, from the side of the storage compartment 21. The containers 22 have been omitted in this view so the holder 29 can be identified clearly on the upper face of the housing 26. A number of light inlet windows 33 are cut out of a rear wall 32 of the housing 26 opposite the open front face 27. If the dispenser is already mounted, the light inlet windows 33 are concealed by an LED housing 58.

In FIG. 5 the LED housing 58 and a printed circuit board 34 are shown in front of the housing 26 of the dispenser. The LED housing 58 is injection molded from clear plastic. It has a closed front face facing away from the observer in FIG. 5, the closed front face completely concealing the light inlet window 33 when the dispenser is assembled and resting against the flat rear wall 32 in a sealed manner around it on a flat surface 83 delimited by a broken line in FIG. 5.

An extended cutout 84 is provided on the rear face of the LED housing 58 to hold the printed circuit board 34.

A tab 85 at one longitudinal end of the surface 83 and one or more screw bosses 86 are molded on the rear wall 32 to fasten the LED housing 58. The LED housing 58 has a projecting lug 87 at one longitudinal end, which can engage in the tab 85. Drilled holes 88, 89 complementing the screw bosses 86 are positioned on the LED housing 58 and the printed circuit board 34 in such a manner that they only overlap with the screw bosses 86 when the lug 87 is inserted in the tab 85 and the printed circuit board 34 has the correct orientation, in this instance with a supply cable 90 going out from an end of the printed circuit board 34 opposite the lug 87, in the cutout 84.

To ensure that incorrect positioning of the printed circuit board 34 in the LED housing 58 is identified and corrected before any attempt to screw both to the rear wall 32, the cutout 84 can be asymmetrical in such a manner that the printed circuit board 34 can only be attached in the cutout 84 with a single orientation. Such asymmetry can be formed for example by pins 91 of the LED housing 58 engaging in the cutout 84 and holes 92 in the printed circuit board 34 receiving the pins 91; it can however also be achieved in that a cutout 93 for the supply cable 90 going out from a front face of the printed circuit board 34 is only formed at one point on the LED housing 58, allowing the supply cable 90 to leave the LED housing 58.

This ensures that the printed circuit board 34 can only be mounted on the housing 26 with one orientation, in which, when the dispenser is fitted in the door 4, the supply cable 90 is long enough to reach a supply connection in the door 4 that complements the plug-type connector 94 at its free end.

A number of lenses 59 are formed in the LED housing 58. In the example shown here there are three groups of lenses 59, to match the number of beverage containers 22. Each group contains four lenses 59. When the printed circuit board 34 has been fitted in the LED housing 58, each lens 59 is located opposite one of the LEDs (not visible in FIG. 5) of the printed circuit board 34.

In the exemplary embodiment in FIG. 5 two lenses 59 overlap respectively with a light inlet window 33. Alternatively each individual lens 59 or each group of lenses 59 could be assigned a light inlet window 33.

Figure 6:
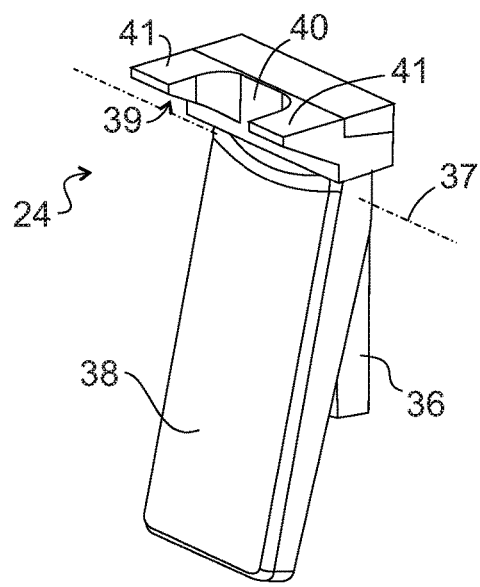
FIG. 6 is a perspective, front view of an actuation lever according to a first embodiment of the dispenser.

FIG. 6 shows an enlarged perspective view of one of the actuation levers 24. The actuation lever 24 is mounted on a socket 36 in such a manner that it can pivot about a horizontal axis 37. A first lever arm 38 extends steeply downward from the axis 37 and forward into the dispenser recess 20, a second lever arm 39 extends essentially horizontally forward from the axis 37. The lever arm 39 is bifurcated by a notch 40, which is open at the front and in which, as shown in FIG. 3, the valve 25 of the container 22 above engages.

The actuation lever 24 is shown in a rest position in FIG. 6. The first lever arm 38 can be pushed back from this rest position toward the socket 36 counter to the force of a reset spring (not shown) inserted between actuation lever 24 and socket 36. At the same time this causes two fingers 41 of the second lever arm 39 on both sides of the valve 25 to move downward and open it, by drawing actuation projections 42 (see FIG. 3) of the valve 25 downward with it.

Figure 7:
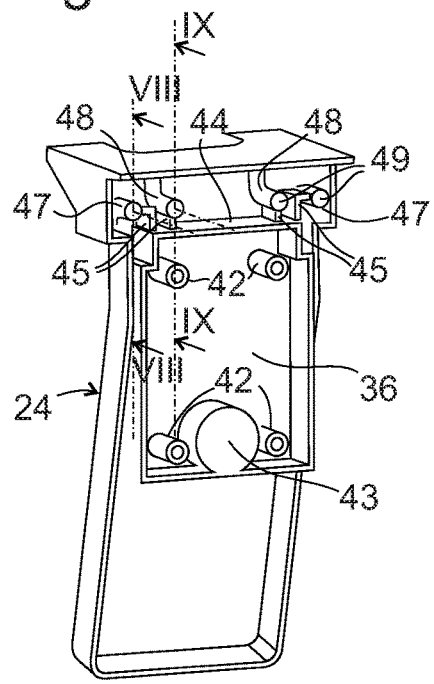
FIG. 7 is a perspective, rear view of the actuation lever from FIG. 6.

As shown clearly in FIG. 7, both the socket 36 and the actuation lever 24 are hollow bodies. They are open in the direction of the rear wall 32 of the housing 26 without indentation and can therefore be injection molded from plastic easily and at low cost. The socket 36 essentially has the shape of a flat box, one of the main faces of which is open and faces the rear wall 32 or in the diagram in FIG. 7 the observer. Screw bosses 42 for securing the socket 36 to the rear wall 32 are formed in the hollow interior of the box.

Also shown is a cutout 43 formed on the front face of the socket 36 facing the actuation lever 24, which holds the reset spring.

A number of fins 45 project from an upper narrow face 44 of the socket 36, with light guides 47, 48 attached to their ends. Each light guide 47, 48 has an inlet window 49, which is opposite one of the LEDs 35 on the printed circuit board 34. After the inlet window 49 the light guides 47, 48 are oriented perpendicular to the rear wall 32 or to the printed circuit board 34 and the LEDS 35 thereon, in order to receive as much of the light emitted from the LEDs predominantly perpendicular to the printed circuit board 34 as possible. Their ends facing away from the rear wall 32 are curved downward in the case of the light guides 47 and upward in the case of the light guides 48, to deflect the light in the direction of the first lever arm 38 in one instance and in the direction of the holder 29 and the beverage containers 22 arranged therein in the other instance.

In the example in FIG. 7 a downward curved light guide 47 and an upward curved light guide 48 are arranged respectively to the right and left of a center plane of the socket 36. It would of course also be conceivable only to provide upward curved or downward curved light guides or just one upward curved light guide on one side of the center plane and one downward curved light guide on the other side of the center plane.

In the simplest instance the light guides 47, 48 are rods made of homogeneous transparent plastic and injection molded as a single piece with the fins 45 and the socket 36. In such an instance an observer cannot see that the socket 36 is also made of transparent plastic, as the socket 36 is completely concealed behind the actuation lever 24 in the interior of the dispenser recess 20. Light losses by way of the fins 46 cannot then be avoided completely, but they can be kept small if the fins 46 are narrow.

Lower loss light guides 47, 48 could be formed by bundles of optical fibers, to which the fins 46 and the socket 36 are injected molded.

Figure 8:
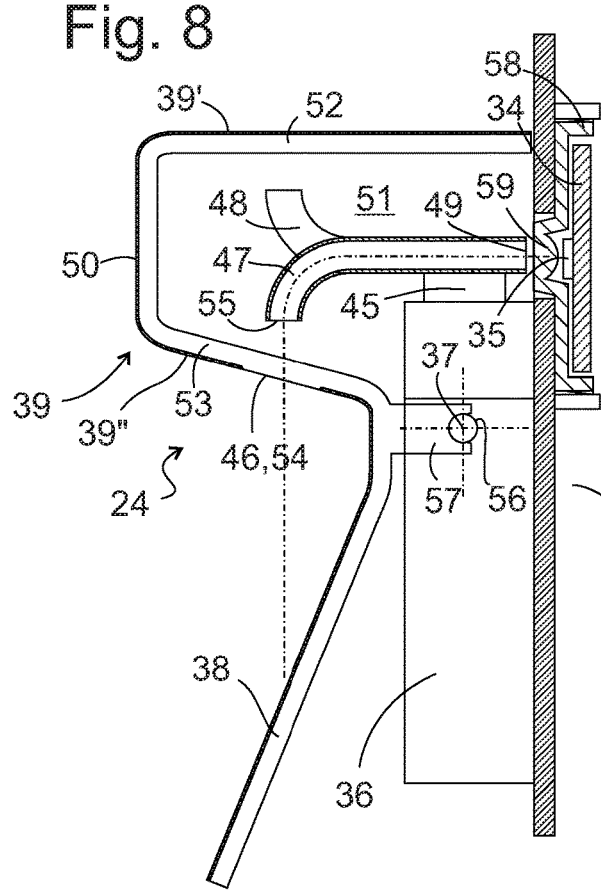
FIG. 8 is a sectional view through the actuation lever along the plane VIII-VIII in FIG. 7.

FIG. 8 shows a section through the rear wall 32, through the LED housing 58 and the printed circuit board 34, which extend in the light inlet window 33 of the rear wall, an LED 35 mounted on the printed circuit board, the socket 36, the actuation lever 24 and the printed circuit board 34 in the plane VIII-VIII from FIG. 7 running along the optical axis of one of the two light guides 47.

A lens 59 is located opposite every LED 35 of the printed circuit board 34 in a projection of the LED housing 58, bringing together the outgoing light, which is only bundled to a minor degree by the LED 35, and feeding it bundled into one of the light guides 47, 48. The lenses 59 each project beyond the front face of the LED housing 58 into the light inlet windows 33 but do not fill them completely, so that the position of the LED housing 58 on the rear wall 32 can be adjusted within certain limits if required before it is screwed into place.

The actuation lever 24 is injection molded from transparent plastic and coated with an opaque coating 50 on at least one face, in this instance the outer face facing the dispenser recess 20. The lever arm 39 of the actuation lever 24 is hollow; the upper and lower faces 39', 39" of the lever arm 39 are each formed by a wall 52 and 53, which enclose a hollow space 51. The light guide 47 extends in the hollow space 51, without touching its upper and lower wall 52 and 53. To form a light outlet 46, by way of which the light from the LEDs 35 passes into the dispenser recess 20, a gap 54 is formed in the opaque coating 50 on the lower wall 53, opposite an outlet window 55 of the light guide 47, so that essentially all of the light leaving the light guide 47 strikes the outlet window 55 and illuminates the outer face of the lever arm 38 below and, if present, a vessel pushed against the lever arm 38.

FIG. 8 also shows a journal 56 projecting from a side wall of the socket 36 and latched into a cutout in a side wall 57 of the actuation lever 24, to define the axis 37.

Figure 9:
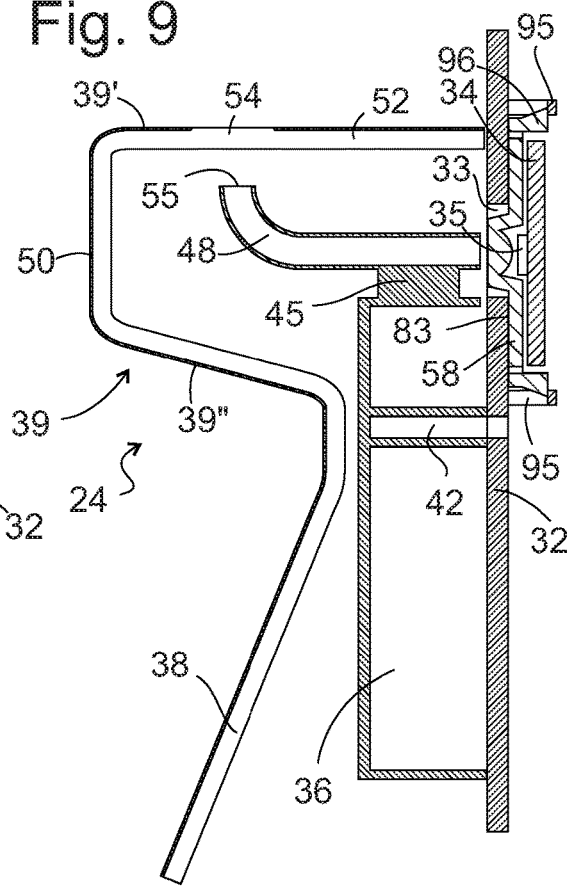
FIG. 9 is a sectional view through the actuation lever along the plane IX-IX in FIG. 5.

FIG. 9 shows a second section through the socket 36, the actuation lever 24 and the printed circuit board 34 in the plane IX-IX from FIG. 7, which runs along the optical axis of one of the upward curved light guides 48. A gap 54 in the opaque coating 50 of the upper wall 52 is located opposite the outlet window 55 of the light guide 48 here. The distance between the outlet window 55 and the wall 52 is so great that the light guide 48 does not touch the wall 52, even when the lever arm 38 comes up against the socket 36.

Light passing through the gap 54 in the upper wall 52 strikes the lower face of the container 22 above it and is reflected back by this into the dispenser recess 20 or is diffused into the container 22.

The transparent coating of the walls 52, 53 is of the same thickness over the entire extent of the gap 54 in FIG. 8 and FIG. 9, so that light passes through the gaps 54 without changing direction. It would however also be conceivable to shape the walls 52, 53 as prisms in the region of the gaps 54 in order to deflect the light in a desired direction with reduced curvature of the light guides 47, 48 or to form lenses in the walls 52, 53 in order in particular to fan the light leaving the light guides 47, 48 in a bundled manner and thus illuminate the dispenser recess 20 evenly.

As also shown in FIG. 9, further tabs 95 can be formed along the longitudinal edges of the LED housing 58 on the rear wall 32 of the dispenser housing 26, in which latching lugs 96 of the LED housing 58 engage. The latching lugs 96 each have an angled flank and, when the LED housing 58 is pushed against the rear wall 32, these can draw back in an elastic manner in contact with the tabs 95 and then, when the LED housing 58 rests against the surface 83, they can enter through holes in the tabs 95. This allows two-stage fixing of the LED housing before it is screwed into place; in some instances the tabs 95 and latching lugs 96 can also completely replace fastening by screwing.

Figure 10:
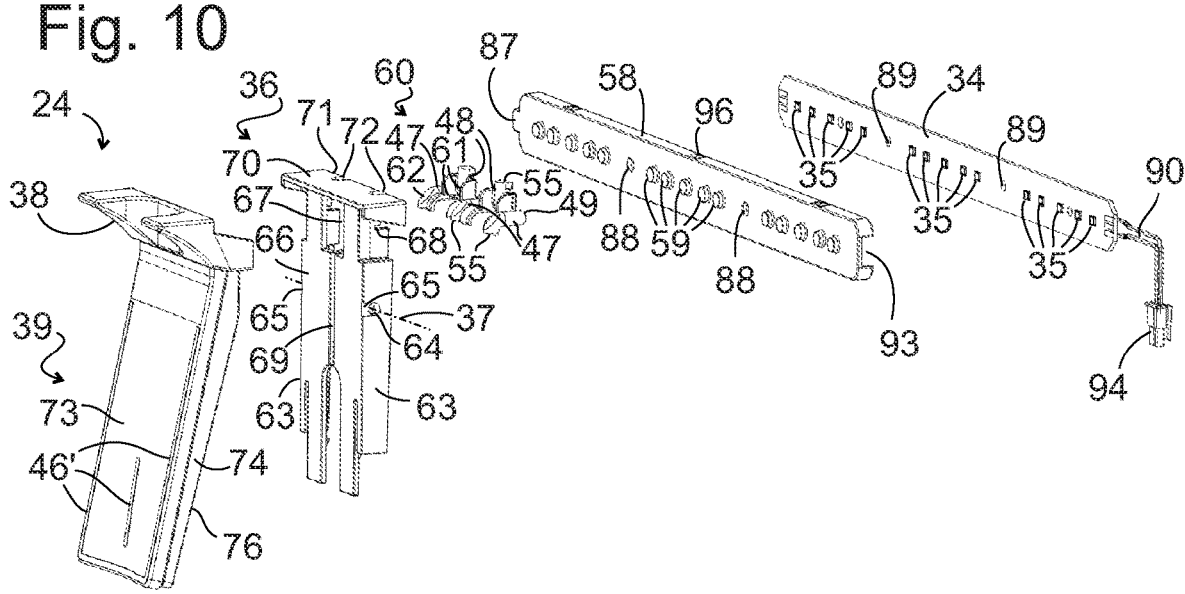
FIG. 10 is a perspective, exploded view of parts of the beverage dispenser according to a second embodiment.

FIG. 10 shows an exploded view of parts of a beverage dispenser according to a second embodiment. Like the one described above, the beverage dispenser is provided for fitting in a refrigeration appliance as shown in FIGS. 1 to 5. The printed circuit board 34 with LEDs 35 and the LED housing 58 are identical to those described above. The housing 26 is omitted in FIG. 10; however one of the sockets 36 to be mounted in the dispenser recess 20 of the housing and the actuation lever 24 to be attached to the socket 36 are shown.

Light guides 47, 48 made of clear plastic opposite the lenses 59 of the LED housing 58 are connected by webs 61 to form a single molded part 60. The light guides 47, 48 comprise inlet windows 49 facing one of the LEDs 35 or one of the lenses 59 and outlet windows 55 aligned alternately upward and downward. In order to deflect light passing by way of the inlet windows 49 into the light guides 47, 48 to the outlet window 55, the light guides 47, 48 can have totally reflecting planar surfaces 62 between inlet and outlet.

The socket 36 is a hollow, roughly box-shaped molded part made of plastic, which is open at its rear face facing the rear wall 32 of the dispenser recess in the mounted state. Opposing depressions 64 are formed on side flanks 63 of the socket 36, holding journals (not visible in the figure) of the actuation lever 24 and thus determining an axis 37, about which the actuation lever 24 can pivot relative to the socket 36.

The depressions 64 are each located at the end of a groove 65, which extends horizontally over the flanks 63 from a front face 66 of the socket 36, so the actuation lever 24 can easily be latched to the socket 36 from the front, by first introducing its journals into the grooves 65 and pushing them to the rear therein, until they latch into the depressions 64.

In proximity to its upper end the socket 36 has a through hole 67, through which the center light guide 47 of the molded part 60 extends in the assembled state. The side flanks 63 of the socket 36 each run between the center light guide 47 and the two outer light guides 47 and each have a horizontal indentation 68. The indentations 68 receive horizontal segments of the webs 61 in the assembled state, thereby securing the molded part 60 in a vertical direction.

A groove 69 extends vertically downward from the through hole 67 in the socket 36.

Two cutouts 72 are formed in an upper wall 70 of the socket 36 from an edge 71 facing the rear wall 32 of the dispenser recess, holding the outlet windows 55 of the light guides 48 in such a manner that their surfaces are flush.

The actuation lever 24 comprises a first lever arm 38 projecting into the dispenser recess above the axis 37 and a second lever arm 39 extending downward at an angle. The second lever arm 39 contains a base plate 73 and fins 74 projecting from a side of the base plate 73 facing the rear wall 32. When the actuation lever 24 is mounted on the socket, two of the fins 74 engage around the flanks 63 of the socket 36 and support the journals engaging in its cutouts 64. A further of the fins 74 is held in the groove 69. Slit-type light outlets 46' are formed on a front face of the base plate 73 opposite the fins 74.

Figure 11:
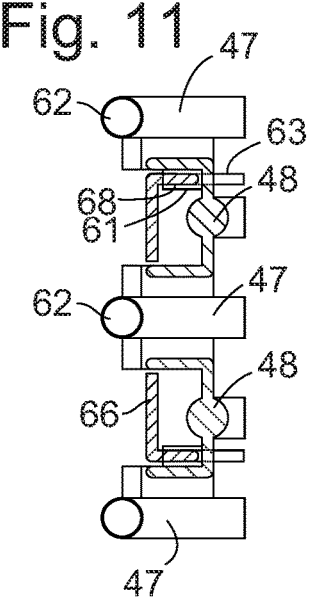
FIG. 11 is a horizontal sectional view through the actuation lever, the socket and the light guide from FIG. 10 in the assembled state.

FIG. 11 shows a horizontal section through the molded part 60 and the socket 36 in the assembled state. The section plane interests the upward facing light guides 48 and vertical segments of the webs 61 connecting the light guides 47, 48 above the indentations 68.

Figure 12:
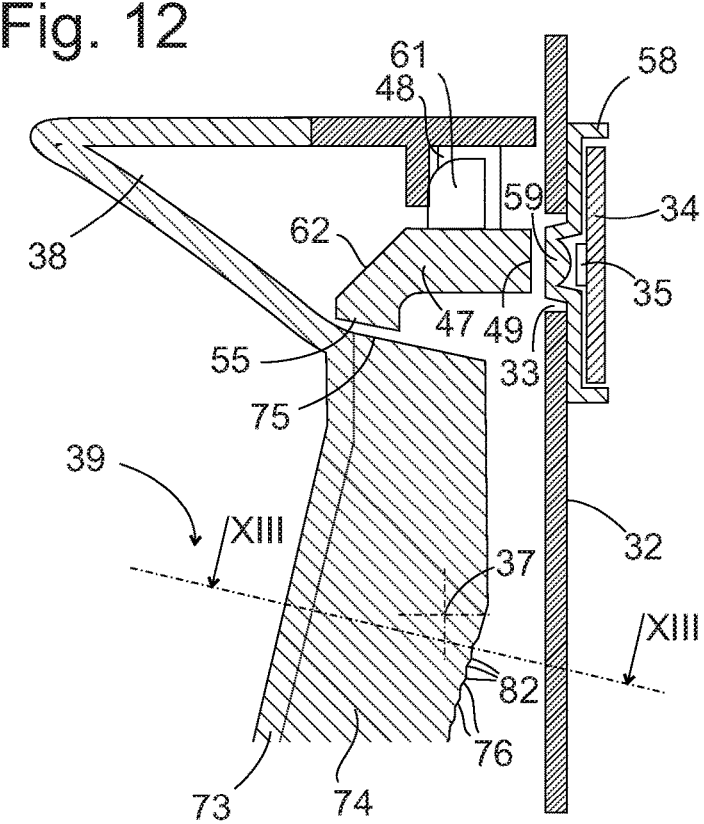
FIG. 12 is a vertical sectional view through the beverage dispenser according to the second embodiment.

FIG. 12 shows a section through the parts shown in FIG. 10 in the assembled state along a plane perpendicular to the axis 37, through the center light guide 47. The housing 58 with the printed circuit board 34 and the socket 36 rest against opposing sides of the rear wall 32. The first lever arm 38 and part of the second lever arm 39 of the actuation lever 24 are visible. The first lever arm 38 is hollow. The second lever arm 39 only appears to be larger than the first, as the section plane runs along the center fin 74; the wall thickness of its base plate 73 corresponds essentially to that of the first lever arm 38.

An upper edge of the base plate 73 and an upper end 75 of the center fin 74 are located opposite the outlet window 55 of the center light guide 47, so that most of the light leaving there is received by the fin 74 molded from clear plastic and conducted downward along the fin 74 in the lever arm 39. An edge of the fin 74 facing away from the base plate 73 is roughened by a grooved contour. Edges 82 of this grooved contour extend parallel to the axis 37 and at right angles to the diffusion direction of the light in the fins 74, so that light striking facets 76 delimited by the edges 82 is reflected in the direction of the base plate 73, thereby favoring the egress of the light by way of light outlet 46' (below the notch shown in FIG. 12).

In FIG. 10 the first lever arm 38 is somewhat wider than the second lever arm 39. This means that the outlet windows 55 of the two outer light guides 47 can also be positioned within the lever arm 38 above the ends of the outer fins 74 and their light can be fed into the outer fins 74.

FIGS. 13 and 14 both show sections through the second lever arm 39. The section plane of FIG. 13 is shown as XIII-XIII in FIG. 12; the section plane in FIG. 14 is below the notch shown in FIG. 12. The base plate 73 and fins 74 projecting therefrom are shown. An opaque coating 77 covers side flanks of the two outer fins 73 and the front face of the base plate 73, apart from the light outlets 46' that are flush with the two outer fins 74. The coating 77 comprises an outer layer 78 in any color harmonizing with the color configuration of the dispenser recess. An inner layer 79 of the coating 77 is white to minimize any damping of the light diffusing in the fins 74 due to absorption at the coating 77.

In FIG. 14 there is also a light outlet 46' opposite the center fin 74. The height of the fins 74 decreases the further they are from the axis 37. The front face of the base plate 73 is concave in FIG. 14, to support a container pushed against it in a lateral direction and to prevent the container from slipping onto a laterally adjacent actuation lever 24.

Like FIG. 12, FIG. 15 shows a section along a plane perpendicular to the axis 37 but the plane in FIG. 15 runs through one of the light guides 48, the outlet window 55 of which is in the upper wall 70 of the socket 36. A vertical side wall 80 of the beverage container 22 abuts against this wall 70. To receive as much of the light from the light guide 48 as possible, the side wall 80 is reinforced by a fin 81 projecting into the interior of the beverage container 22, in the same way as the base plate 73, as shown in FIG. 16 in a horizontal section along the plane XVI-XVI from FIG. 15. The cross section of the fin 81 decreases as the distance from the outlet window 55 increases, so that the light is scattered into the beverage container 22 and distributed over the height of the fin 81 to illuminate its contents in a visible manner through the insulating glass pane 17.

The following is a summary list of reference numerals and the corresponding structure used in the above description of the invention:

1 Door assembly
2 Carcass
3 Axis
4 Door
5 Cover
6 Window pane
7 Frame
8 Leg
9 Leg
10 Leg
11 Leg
12 Handle cutout
13 Center piece
14 Outer wall
15 Inner wall
16 Hollow space
17 Insulating glass pane
18 Handle groove
19 Web
20 Dispenser recess
21 Storage compartment
22 Beverage container
22' Lower face of beverage container
23 Recess
24 Actuation lever
25 Valve
26 Housing
27 Front face
28 Opening 29 Holder
30 Container lower part
31 Lid
32 Rear wall
33 Light inlet window
34 Printed circuit board
35 LED
36 Socket
37 Axis
38 First lever arm
39 Second lever arm
39' Upper face of second lever arm
39" Lower face of second lever arm
40 Notch
41 Finger
42 Screw boss
43 Cutout
44 Narrow face
45 Fin
46 Upper light outlet
46' Lower light outlet
47 Light guide
48 Light guide
49 Inlet window
50 Coating
51 Hollow space
52 Upper wall
53 Lower wall
54 Gap
55 Outlet window
56 Journal
57 Side wall
58 Housing
59 Lens
60 Molded part
61 Web
62 Planar surface
63 Side flank
64 Depression
65 Groove
66 Front face
67 Through hole
68 Indentation
69 Groove
70 Upper wall
71 Edge
72 Cutout
73 Base plate
74 Fin
75 Upper end
76 Facet
77 Coating
78 Outer layer
79 Inner layer
80 Side wall
81 Fin
82 Edge
83 Surface
84 Cutout
85 Tab
86 Screw boss
87 Lug
88 Drilled hole
89 Drilled hole
90 Supply cable
91 Pin
92 Hole
93 Cutout
94 Plug-type connector
95 Tab
96 Latching lug

The invention claimed is:

1. A beverage dispenser, comprising:
a housing enclosing a dispenser recess and having at least one light inlet window formed in said housing enclosing said dispenser recess for lighting said dispenser recess;
an LED housing sealing said at least one light inlet window, said LED housing having a plurality of light-emitting diodes (LEDs);
a printed circuit board on which said plurality of LEDs are disposed for feeding light into said dispenser recess by way of said at least one light inlet window, said printed circuit board being mounted on said housing of said dispenser recess by said LED housing;
at least one light guide including a transparent, light transmissive body disposed in said dispenser recess;
an actuation lever molded from a transparent material;
a socket for said actuation lever being mounted in said dispenser recess, said at least one light guide being held by said socket adjacent to said at least one light inlet window to distribute light from said LEDs; and
said at least one light guide disposed to direct light into said actuation lever.

2. The beverage dispenser according to claim 1, wherein said LED housing is inserted into said light inlet window from a side facing away from said dispenser recess.

3. The beverage dispenser according to claim 1, wherein said LED housing and said housing of the beverage dispenser touch one another in a sealing manner on a flat surface.

4. The beverage dispenser according to claim 1, wherein said LED housing is molded as a single piece from a transparent material.

5. The beverage dispenser according to claim 4, wherein said LED housing contains lenses disposed in a beam path of said LEDs.

6. The beverage dispenser according to claim 1, wherein said housing is configured to mate with said LED housing in only a single orientation.

7. The beverage dispenser according to claim 1, wherein said LED housing and said printed circuit board have interacting contours, to allow said printed circuit board to be attached to said LED housing with a single orientation.

8. The beverage dispenser according to claim 1, wherein said actuation lever has a plate-shaped lever arm and a light outlet extending along an edge of said plate-shaped lever arm or is disposed at a central point of said plate-shaped lever arm.

9. The beverage dispenser according to claim 8, wherein said light outlet and a rough surface are opposite one another on two sides of said actuation lever.

10. The beverage dispenser according to claim 8, wherein said plate-shaped lever arm has a base plate and a fin projecting from said base plate, which extends from an end of said light guide to said light outlet.

11. The beverage dispenser according to claim 1, wherein said actuation lever has an opaque coating and a light outlet is formed by a gap in said opaque coating.

12. The beverage dispenser according to claim 11, wherein said opaque coating has an inner layer and outer layer, said inner layer being lighter than said outer layer.

13. The beverage dispenser according to claim 1, wherein said at least one light guide is disposed so as to light a beverage container disposed above said dispenser recess.

14. The beverage dispenser according to claim 1, wherein:
said dispenser recess is open toward a front face of said housing; and
said housing has a holder for at least one beverage container disposed above said dispenser recess.

15. A refrigeration appliance, comprising:
a heat-insulating wall; and
a beverage dispenser, containing:
a housing enclosing a dispenser recess and having at least one light inlet window formed in said housing enclosing said dispenser recess for lighting said dispenser recess, said housing being let into said heat-insulating wall;
an LED housing sealing said at least one light inlet window, said LED housing having a plurality of light-emitting diodes (LEDs);
a printed circuit board on which said plurality of LEDs are disposed for feeding light into said dispenser recess by way of said at least one light inlet window, said printed circuit board is mounted on said housing of said dispenser recess by said LED housing;
at least one light guide including a transparent, light transmissive body disposed in said dispenser recess;
an actuation lever molded from a transparent material;
a socket for said actuation lever being mounted in said dispenser recess, said at least one light guide being held by said socket adjacent to said at least one light inlet window to distribute light from said LEDs; and
said at least one light guide disposed to direct light into said actuation lever.

* * * * *